(12) United States Patent
Lefebvre et al.

(10) Patent No.: US 7,098,771 B2
(45) Date of Patent: Aug. 29, 2006

(54) METHOD FOR OFFLINE-PARAMETERING OF A FIELD DEVICE OF THE PROCESS AUTOMATION TECHNOLOGY

(75) Inventors: Martine Lefebvre, Blotzheim (FR); Bert Von Stein, Schopfheim (DE); Andrea Seger, Schopfheim (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 10/700,048

(22) Filed: Nov. 4, 2003

(65) Prior Publication Data

US 2004/0193287 A1    Sep. 30, 2004

(30) Foreign Application Priority Data

Nov. 4, 2002    (DE) ................. 102 51 503

(51) Int. Cl.
*G08B 9/00*    (2006.01)

(52) U.S. Cl. ...................... 340/286.02; 340/286.01; 340/286.06

(58) Field of Classification Search ........... 340/286.01, 340/286.02, 286.04, 286.05, 286.06; 709/203, 709/208, 221; 711/100, 170; 702/122; 700/83, 700/117, 7

See application file for complete search history.

(56) References Cited

U.S. PATENT DOCUMENTS

| | | | | |
|---|---|---|---|---|
| 5,841,654 A | * | 11/1998 | Verissimo et al. | 700/83 |
| 5,963,444 A | * | 10/1999 | Shidara et al. | 700/7 |
| 5,970,430 A | * | 10/1999 | Burns et al. | 702/122 |
| 6,055,633 A | * | 4/2000 | Schrier et al. | 713/100 |
| 6,366,272 B1 | * | 4/2002 | Rosenberg et al. | 345/156 |
| 6,839,721 B1 | * | 1/2005 | Schwols | 707/200 |
| 6,848,105 B1 | * | 1/2005 | Belt et al. | 719/311 |
| 6,850,973 B1 | * | 2/2005 | Larson et al. | 709/221 |

* cited by examiner

*Primary Examiner*—Van T. Trieu
(74) *Attorney, Agent, or Firm*—Bacon & Thomas

(57) ABSTRACT

In a method for offline parametering of a field device with the help of an operating program B running on an operating device B, the operating program B communicates with a copy of the device software program GS that runs in the field device F1.

8 Claims, 2 Drawing Sheets

METHOD FOR OFFLINE-PARAMETERING OF A FIELD DEVICE OF THE PROCESS AUTOMATION TECHNOLOGY

FIELD OF THE INVENTION

The invention relates to a method for offline parameterization of a field device of the process automation technology with the help of an operating program BW running on an operating device B, which operating program communicates with a field device F1 over a data bus D for online parameterization and for which no device description is available describing the offline behavior of the field device F1.

In the process automation technology, field devices are frequently utilized that serve for registering and/or influencing process variables. Examples of such field devices are fill level measurement devices, mass flow meters, pressure gages, thermometers, etc., which, as sensors, register the corresponding process variables fill level, mass flow rate, pressure and temperature, respectively, and so-called actors, which e.g., as valves, control the flow rate of a liquid in a section of pipe or pumps in the fill level of a medium in a container.

Field devices are often connected over appropriate communication connections, as a rule over a field bus, with a control unit (e.g. programmable logic controller PLC), which controls the process flow. In this control unit, the measurements of the various sensors are evaluated and the appropriate actors actuated.

Usually, the field bus is connected, as well, with a higher level communications network, which serves for data communication with a control system (Siemens Simatic S7, Fisher-Rosemount Delta V, ABB Symphony) and perhaps also with business systems (e.g. SAP R/3).

In the control system, the process flow is monitored and visualized. The control system also enables a direct access for operating, parameterization or configuring individual field devices. Through this access, special settings (e.g. parameters) can be changed in the field devices, or diagnostic functions can be called up.

Along with the access through the control system, a temporary access on site is also possible e.g. using an operating device, such as a portable personal computer (laptop) or a portable, manual operating device (handheld). The operating programs installed in the operating devices or control systems are also referenced as operating tools.

In the past, each field device manufacturer developed corresponding operating tools for operating its field devices. This led to a multiplicity of different operating tools on the market. Since modern operating tools must not only enable the operating of their own field devices but also those of other manufacturers, the functionality of the field device to be operated must be made known to the currently connected operating tool. The functionality of a field device is normally described by means of a device description. For this purpose, special, standardized device description languages are available. Examples are CAN-EDS (Control Area Network-Electronic Data Shield), HART-DDL (HART Device Descriptions Language), FF-DDL (Fieldbus Foundation-Device Descriptions Language, Profibus-GSD), Profibus-GSD, Profibus-EDD (Profibus-Electronic Device Descriptions).

Data transfer between the field devices and the control systems proceeds by way of the known international standards for field busses, such as e.g. HART®, Foundation Fieldbus FF, Profibus, CAN, etc.

As already mentioned, the parameters of the individual field devices can be modified using a corresponding operating program. Examples for such parameters are measurement range, limit values, units, etc.

As a rule, the field device that is to be operated is connected physically by way of a data bus with the computer system (operating device, control system) in which the operating program is installed. During operation, communication is possible between operating program and field device. This is referred to as online-operating. The parameters are read out of the field device and, directly after the modification, transferred to the field device and stored therein. In this connection, the dependencies among parameters are immediately taken into consideration. A change of a parameter can lead to the change of further parameters or change the observability of a parameter or change the valid range of a parameter. An example for this: If the parameter "Total Reset" is set to "yes", then the action "Set parameter TotSum to 0" is initiated in the field device. The corresponding data description for the online-operation reads: After the writing of TotReset, read out the parameter TotSum. The device responds by setting TotSum to 0 and outputs the desired value.

Besides the online-operation, an offline-operation is also desired, i.e. when, during the operation procedure, no communication with the field device can occur; for instance, the corresponding field device is not connected with the data bus at the point in time of the operation or it is momentarily executing important process functions that are not to be interrupted. Such offline-parametering is e.g. possible with the operating program CommunWin® of the firm Endress+Hauser.

In order to enable an offline parameterization of a particular field device, it is necessary, either to expand an already existing device description for this field device, which describes the offline behavior of this field device, or to produce a new device description, which includes the offline behavior of this field device. For simple field devices, this is immediately possible. For field devices, which possess a comprehensive functionality, and, therefore, exhibit a multitude of parameters with corresponding dependencies, this is, however, not possible without a considerable programming expense. Especially value assignments of variables and calculations are very difficult to describe. Frequently it is not even possible to describe the offline behavior of a complex field device completely with one of the known device description languages. Because of the high programming expense, an offline parametering is e.g. currently not possible in the case of field devices of the PNG-series of Endress+Hauser®.

SUMMARY OF THE INVENTION

Object of the invention is, therefore, to provide a method for offline-parameterization of a field device of the process automation technology. The method should require no great programming expense and be simple and cost favorable to carry out.

The object of the invention is solved by the method according to which the operating program B communicates with a copy of the device software program GS running in the field device F1 and an online field device F1 is simulated thereby. The essential idea of the invention resides therein, that, for offline-parameterization, the operating program communicates not with the device software program, which runs on a microprocessor in the field device, but, instead, with a copy of the device software program running on a separate computer unit. Consequently, a device description, which describes the special offline-behavior of the field device, is not necessary, since the operating program sees, in effect, an online field device.

In a further development of the invention, operating program and the copy of the device software program are installed on one computer unit. Thus, both programs can be executed together e.g. on a laptop, without the user noticing this while executing the operating program.

Advantageously, the operating program and the copy of the device software program are joined with one another over a virtual interface COM-interface.

Advantageously, the operating device has a Windows®-platform. For this purpose, an easy-to-program Windows®-shell is required for the device software program.

BRIEF DESCRIPTION OF THE DRAWING

The invention is explained below in more detail on the basis of an example of an embodiment illustrated in the drawing, whose figures show.

DESCRIPTION OF THE PREFERRED EMBODIMENT

Figure 1:
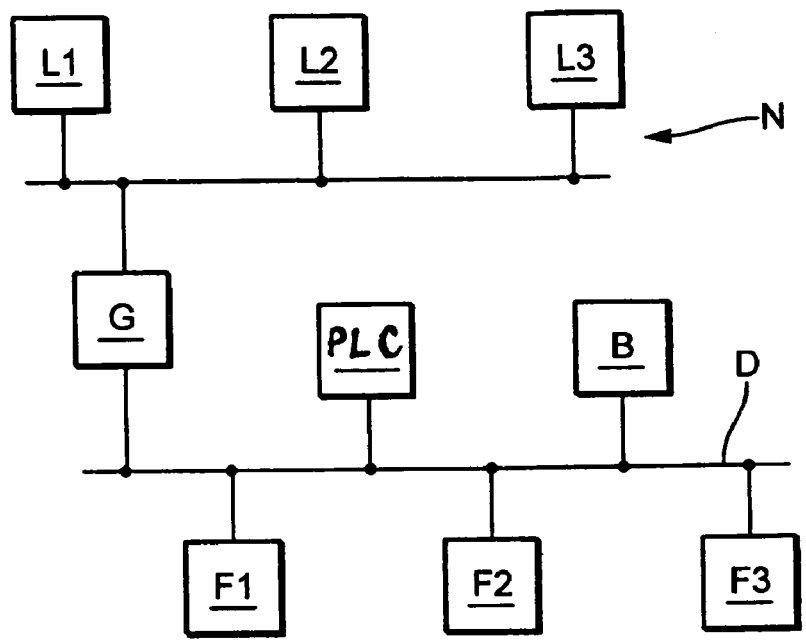
FIG. 1 is a block diagram of a process automation technology installation.

The process automation installation illustrated in FIG. 1 shows a programmable logic controller PLC, which is connected over a data bus D with a plurality of field devices F1, F2, F3, etc. The field devices F1, F2, F3 can be e.g. pressure gauges, thermometers, flow meters, etc. The field devices F1, F2, F3 are "intelligent" field devices with corresponding microprocessors, in which the associated device software programs run for determining the functionality of the field devices.

The controller PLC communicates over the data bus D with each field device. In this way, data can be transferred between the field devices F1, F2, F3 and the controller PLC.

Data communication proceeds on the data bus according to the corresponding international standards, such as CAN, Profibus, HART® or FF. Connected to the data bus D is an operating device B, in which the operating program (e.g. FieldTool® of the firm Endress+Hauser) is installed. The data bus D, which represents the so-called field bus, is connected over a gateway G with a higher level, firm network N. Connected to the firm network N are various control systems L1 (SCADA), L2 (visualization) and L3 (engineering). The higher level, firm network N includes also a network connection to business systems, such as e.g. SAP R/3.

Figure 2:
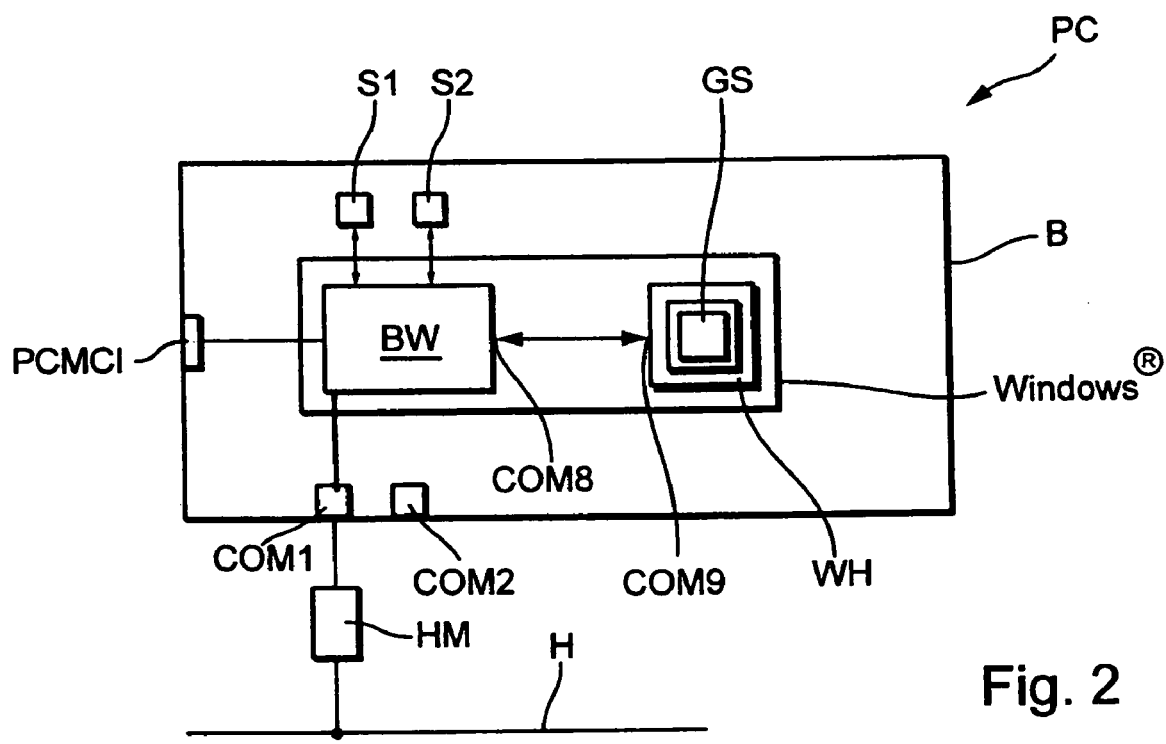
FIG. 2 is a schematic structure of a field device.

FIG. 2 shows in more detail the construction of the operating device B. In the present example, operating device B is a personal computer PC (laptop), which exhibits essentially two external COM-ports COM1 and COM2 and a PC-card slot PCMCI e.g. for a Profibus® interface card. The further, usual external components of a PC, such as keyboard, screen, etc. are not shown.

The operating device can be connected with the various data busses over the COM-ports or the interface card, as the case may be. In this example, the COM1-port, COM1, is connected with a HART®-bus H through a HART®-modem HM.

In the personal computer PC are installed an operating program BW and a device software program GS, which both e.g. can operate in the Windows.RTM. operating system. The operating program BW is connected with a memory S1, which provides the device descriptions for different field devices and a memory S2 for the storage of parameter values. It has a virtual interface COM8, which is connected with a virtual interface COM9 of the device software program. The device software program GS is a copy of the software running in the field device. This software is referred to also as "embedded software". In order that this software can run in the Windows operating system, the device software program GS is surrounded by a windows shell WH.

Figure 3:
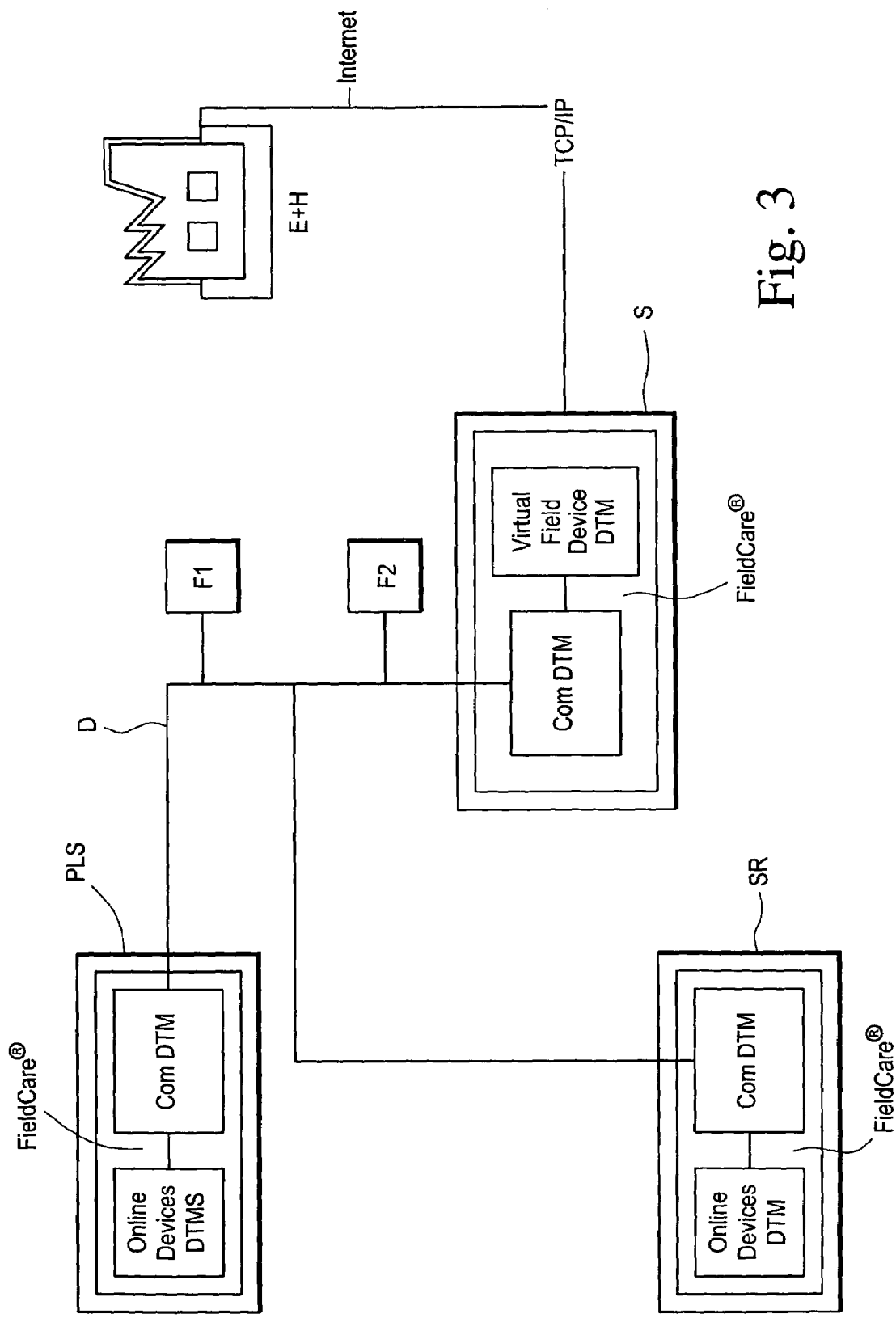
FIG. 3 is a data bus with several field devices.

FIG. 3 shows a data bus D, on which are connected the two field devices F1, F2, a process control system PLS, a service computer SR, and a server computer S. Framework application on each of the computers PLS, SR and S is the operating program FieldCare® of the firm Endress+Hauser. This program works on the FDT/DTM standard. The FDT specifications are available as Profibus-Guidelines Order No.: 2.162 in the Version 1.2.

The device drivers F1-DTM, F2-DTM and a COM-DTM are available in the process control system PLS and in the service computer SR as device descriptions. The device driver F1-DTM belongs to the field device F1 and the device driver F2-DTM to the field device F2. The COM-DTM is responsible for communication with the data bus D. Available on the server S are a COM DTM and a virtual device driver VF-DTM, for a certain field device F3. This means that two online field devices F1 and F2 are connected with the data bus D. The field device F3 is not physically connected with the data bus D, it is simulated by the virtual device driver VF-DTM. Additionally, the server computer S is connected over an Internet connection with the device manufacturer E+H of the field device F3.

The method of the invention for offline parameterization is explained in more detail using the example of field device F1 as follows. On a user interface of the operating program running on the operating device, the user chooses the field device F1 to be operated and the operating mode offline parameterization. In the choice online mode, a direct communication over the corresponding interface COM1, COM2 or the interface card would be possible with the device software program GS, which is executed on the microprocessor of the field device F1.

The operating program BW communicates in the offline mode over the COM8 and COM9 interface with a copy of the device software program GS and sees thus, in effect, the field device F1, as if it were online. The original of the device software program GS runs normally on a microprocessor in the field device F1. The user can now effect the parameter changes in the usual manner. The parameter changes are stored in the memory S2, taking into consideration the dependencies, and, as soon as a communication with the field device F1 is again possible over the field bus, following a confirmation by the user (changed parameter download yes/no), transferred to the field device F1 and stored therein.

In a special, further development of the invention, these pieces of information (TAG-numbers and bus addresses) are directly transmitted to the field device manufacturer, in order to pre-configure the field devices there already during the manufacturing process. The user can connect the field devices to the data bus D immediately after their delivery.

The essential idea of the invention lies in that, for offline parameterization of a field device, the corresponding operating program BW communicates with a copy of the device software program GS, which runs on a computer unit independent of the field device.

The invention claimed is:

1. A method for the offline parameterization of a field device for process automation technology with the help of an operating program BW running on an operating device B, which is normally used for parameterization an online field device, comprising the steps of:

communicating the operating program BW with a field device F1 over a data bus D for online parameterization and for which no device description is available describing the offline behavior of the field device F1; and communicating the operating program BW with a copy of the device software program GS running on a device different from the field device F1, thereby simulating an online field device F1.

2. The method as claimed in claim 1, wherein the copy of the device software program GS and the operating program BW are executed together on the operating device B.

3. The method as claimed in claim 1, wherein the copy of the device software program GS and the operating program BW communicate over a virtual COM-interface.

4. The method as claimed in claim 1, wherein the operating device has a Windows® platform.

5. The method as claimed in claim 1, wherein the copy of the device software program GS is surrounded by a Windows® shell.

6. The method as claimed in claim 1, wherein the copy of the device software program GS is surrounded by a DTM (Device Type Manager) shell.

7. The method as claimed in claim 1, wherein the operating device B is a laptop computer unit.

8. The method as claimed in claim 1, wherein parameter settings of the offline parametering are transferred to the field device manufacturer for pre-configuring of field devices.

* * * * *